(12) United States Patent  
Shmunis

(10) Patent No.: US 8,805,399 B2  
(45) Date of Patent: Aug. 12, 2014

(54) DOCK STATION FOR MOBILE DEVICES

(75) Inventor: Vladimir Shmunis, Hillsborough, CA (US)

(73) Assignee: RingCentral, Inc., San Mateo, CA (US)

( * ) Notice: Subject to any disclaimer, the term of this patent is extended or adjusted under 35 U.S.C. 154(b) by 221 days.

(21) Appl. No.: 12/849,481

(22) Filed: Aug. 3, 2010

(65) Prior Publication Data

US 2011/0053643 A1    Mar. 3, 2011

Related U.S. Application Data

(60) Provisional application No. 61/238,991, filed on Sep. 1, 2009.

(51) Int. Cl.
*H04M 1/00* (2006.01)

(52) U.S. Cl.
USPC .................................. 455/456.1; 370/338

(58) Field of Classification Search
USPC .................................. 455/566.1; 370/338
See application file for complete search history.

(56) References Cited

U.S. PATENT DOCUMENTS

| | | | |
|---|---|---|---|
| 6,363,246 B1 * | 3/2002 | Williams et al. .............. 455/403 |
| 2003/0008612 A1 | 1/2003 | Andreason | |
| 2003/0078071 A1 * | 4/2003 | Uchiyama .................... 455/557 |
| 2008/0026794 A1 * | 1/2008 | Warren ......................... 455/557 |
| 2008/0254762 A1 * | 10/2008 | Igval ........................... 455/404.1 |
| 2009/0023442 A1 * | 1/2009 | Ahmed et al. ............. 455/426.2 |
| 2010/0081380 A1 | 4/2010 | Lim et al. | |

FOREIGN PATENT DOCUMENTS

| | | |
|---|---|---|
| KR | 10-2009-0058808 | 6/2009 |
| KR | 10-2010-0065221 | 6/2010 |

OTHER PUBLICATIONS

Authorized Officer Sang Moon Bok, Notification of Transmittal of the International Search Report and the Written Opinion of the International Searching Authority, or the Declaration, for Application No. PCT/US2010/044196, mailed Apr. 29, 2011, 9 pp.

International Preliminary Report on Patentability from International Application No. PCT/US2010/044196, mailed Mar. 15, 2012, 6 pgs.

* cited by examiner

*Primary Examiner* — Marcos Batista

(74) *Attorney, Agent, or Firm* — Fish & Richardson P.C.

(57) ABSTRACT

Systems, methods and computer program products for processing a call as between a mobile device and a linked base telephone system are described. A phone docking station allows the mobile device to be linked to the base telephone system. Features of either the mobile device or the base telephone system may be used to support a call. For example, through the phone docking station, one or more features and functions of the mobile device may be enabled on or supported by the base telephone system.

21 Claims, 6 Drawing Sheets

DOCK STATION FOR MOBILE DEVICES

TECHNICAL FIELD

This subject matter relates to telecommunication call processing and support.

BACKGROUND

Mobile communication devices (e.g., mobile handsets, smart phones, mobile walkie-talkie devices and the like, and hereinafter referred to as "mobile devices") may be used to perform an ever increasing number of functions, including voice communication, Internet browsing and messaging. Because of their inherent portability, mobile devices can be used in places where wired telephone systems are present, such as at a place of business or home. This overlap results in individuals having more than one telephone number that can be used to contact them at a single location (i.e., a mobile telephone number and an office telephone number when a user is in the office, or a mobile telephone number and a home telephone number when a user is at home, etc.).

Wired telephones may not offer the same convenient features that are available with the mobile device. For example, most conventional wired telephones do not provide a user interface that can be used to access the Internet or support electronic messaging.

SUMMARY

Systems, methods and computer program products for processing communications are provided. One example of processing includes transferring a call from a mobile device to a base telephone system using a phone docking station. The phone docking station allows the mobile device and other portable electronics to be docked (or cradled) to the base telephone system. The phone docking station, in some implementations, may provide a link (e.g., physical or electronic) for quickly and conveniently coupling the mobile device to the base telephone system. Through the phone docking station, one or more features and functions of the mobile device may be enabled on or supported by the base telephone system.

In some implementations, a method is described that includes linking a mobile device to a base telephone system using a link, the mobile device including a telephony communication link and the base telephone system including a different independent telephony communication link; receiving a call on a number associated with the mobile device; presenting information related to the call on a display associated with the mobile device; using the link, passing call information associated with the call between the mobile device and the base telephone system where the call information may include one or more signals associated with a received call; and supporting the call using the base telephone system.

In some implementations, a method is described that includes initiating a call on a base telephone system using a telephony communication link; after initiating the call, linking the base telephone system to a mobile device through a dock; transferring, through the dock, one or more signals associated with the call on the base telephone system to the mobile device, the mobile device including a different independent telephony communication link; and supporting the call using the mobile device.

In some implementations, a device is described that includes a link coupling the dock to a mobile device, the mobile device including a separate independent link to a telephony system, the link communicating one or more signals between the mobile device and the base telephone system, the signals being associated with calls originating on either the mobile device or the base telephone system.

The details of one or more implementations for call processing associated with mobile devices are set forth in the accompanying drawings and the description below. Other features, objects, and advantages of the techniques will be apparent from the description and drawings, and from the claims.

DESCRIPTION OF DRAWINGS

Like reference symbols in the various drawings indicate like elements.

DETAILED DESCRIPTION

Overview

As will be described in greater detail below, a phone docking station may be provided that allows mobile devices (e.g., smart phones, personal digital assistants, and other portable electronics that include an independent wireless telephony connection) to be docked to a base telephone system (e.g., a wired home telephone, office telephone, voice-over-internet-protocol (VoIP) or other IP phones). The base telephone system may be a simple landline connected to a local telecommunication network or a computer including a VOIP connection. The phone docking station, in some implementations, may provide a docking platform for quickly and conveniently coupling the mobile device to the base telephone system. Through the phone docking station, one or more features and functions of a mobile device may be enabled for use with the base telephone system. Similarly, through the phone docking station, one or more features and functions of the base telephone system may be enabled for use with the mobile device.

Virtual Private Branch Exchange Overview

A private branch exchange ("PBX") is a telephone network that serves a business or office, in contrast to a common carrier. A PBX system may include one or more VOIP servers, a call management program, and a gateway between a data and voice network. A virtual PBX (vPBX) system is a PBX system whose VOIP servers, call management program, and gateway are located remotely from the office or business, typically at a vPBX service provider. A mobile device, such as a cellular mobile device, is a portable computer device that may wirelessly connect to a data network or a voice network or both. A mobile device typically has a display screen or a keyboard, or both. A mobile device may be of the form of a cellular telephone, a personal digital assistant (PDA), a smart phone, or other portable device that includes a telephony transceiver and the like. An extension is a subtree or branch from a main number assigned in a telephony system. An extension may be assigned to a device, such as a mobile device or landline phone, that is connected to a PBX system. The PBX system operates as a switchboard for the extensions. A user is a person who uses the vPBX system. A call is a connection between a calling party and a called party over a network. The network may include a voice network, a data network (e.g., including fax capability), or both. A caller, or calling party, is a person or device who initiates a call. A callee, or called party, is a person or device who receives a call.

Call Management System Overview

Figure 1:
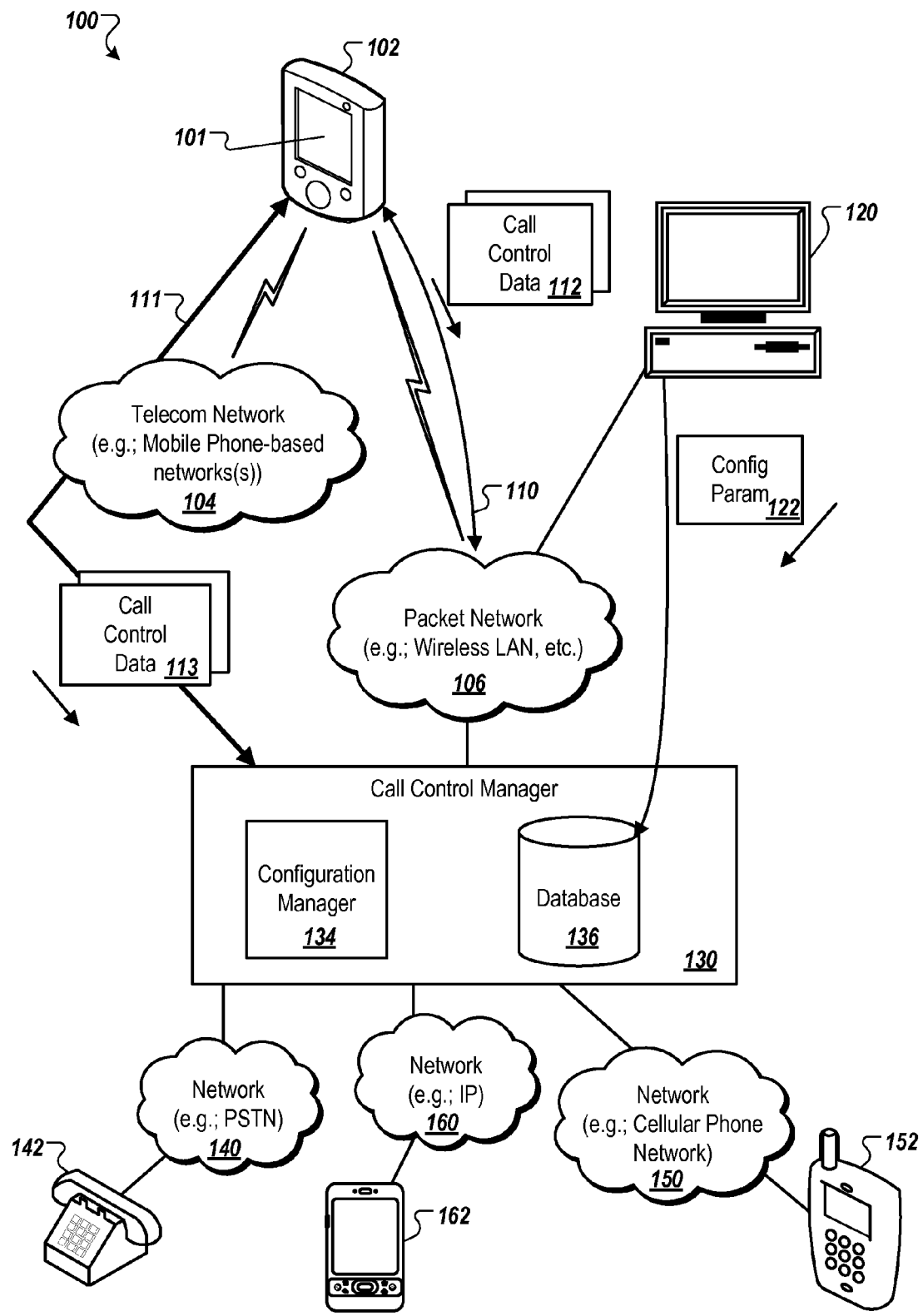
FIG. 1 is a block diagram of an example call management system.

FIG. 1 is a block diagram of a call management system 100. As shown in FIG. 1, the mobile device 102 may be configured to communicate using multiple modes of communication (e.g., "multi-modal channels of communication"). The network 104 may operate in accordance with a first mode of communication. Examples of the first mode of communication include Public Switched Telephone Network ("PSTN") phone technologies, cellular/wireless telephone technologies/standards, such as Global System for Mobile communications ("GSM"), Frequency Division Multiple Access ("FDMA"), Time Division Multiple Access ("TDMA"), Code division multiple access ("CDMA"), and other communications protocols such as Session Initiation Protocol and the like. The network 106 may operate in accordance with a second mode of communication. Examples of the second mode of communication may include VOIP phone technologies, wireless LAN technologies (e.g., telephone technologies/standards, such as WiMAX and any other IEEE 802.xx-based technologies/standards), and the like. Any number of modes is possible.

The mobile device 102 may be configured to interact with a call control manager 130 over a call control communications channel, which in some implementations may be a broadband call control channel 110. In some implementations, the broadband call control channel 110 may be established in the network 106 (e.g., in the same or separate channel used to convey voice/video data, such as in a Session Initiation Protocol ("SIP") message). In some implementations, another narrowband call control channel 111 may be established in the network 104 (e.g., a mobile operator may provide in the same or separate channel used to convey voice/video data, such as in an Short Message Service ("SMS") message). The mobile device 102 and/or the call control manager 130 may be configured to establish narrowband call control channel 111 and/or broadband call control channel 110 so that the mobile device 102 and/or the call control manager 130 may transmit and/or receive the call control data 113 (over the narrowband call control channel 111) and/or call control data 112 (over the broadband call control channel 110).

The call control manager 130 may be configured to effect a number of call controlling functions that may be performed remotely from the mobile device 102. For example, the call control manager 130 may perform call control operations in association with a first call from a phone 142 via the network 140 and/or a second call from a phone 152 via the network 150 and/or a third call from a phone 162 via the network 160.

The mobile device 102 may include an interface 101 for facilitating generation, receipt, processing, and management of the call control data 112/113 for delivery over the narrowband call control channel 111 and/or the broadband call control channel 110. The interface 101 may be configured to implement various functionalities, including receiving inbound calls, dialing outbound calls, and click to call generating a combined inbound and outbound call.

In some implementations, the call control manager 130 may include a configuration manager 134, and a repository ("DB") 136. The call control manager 130 may provide for bridging calls generated by disparate telecommunications technologies associated with communications devices 142 and 152 and 162. For example, as an alternative to answering an inbound call on the mobile device 102, the call may be recorded (such as voice mail) on the mobile device 102 and/or on the call control manager 130 and simultaneously reviewed on the mobile device 102 via the user interface 101. During call recording, the inbound call may be answered dynamically at the mobile device 102 and/or transferred to one or more of communications devices 142, 152, and 162. Completed recordings (e.g., announcements, voice mail, etc.) may be reviewed at the mobile device 102 via user interface 101.

The configuration manager 134 may be configured to interact with a remote computing device 120 or with the mobile device 102 to receive configuration parameter data ("conf param") 122. Further, the configuration manager 134 may be configured to store configuration parameter data 122, and responsive to such data, the call control manager 130 may be implemented by a user to control inbound calls before, during, or after reaching the mobile device 102. Further, the configuration manager 134 may be configured to store in the database 136 audio or video files recorded via the user interface 101 on the mobile device 102 and transmitted to the call control manager 130 via the narrowband call control channel 111 and/or the broadband call control channel 110.

Example Mobile Device Implementation

Figure 2:
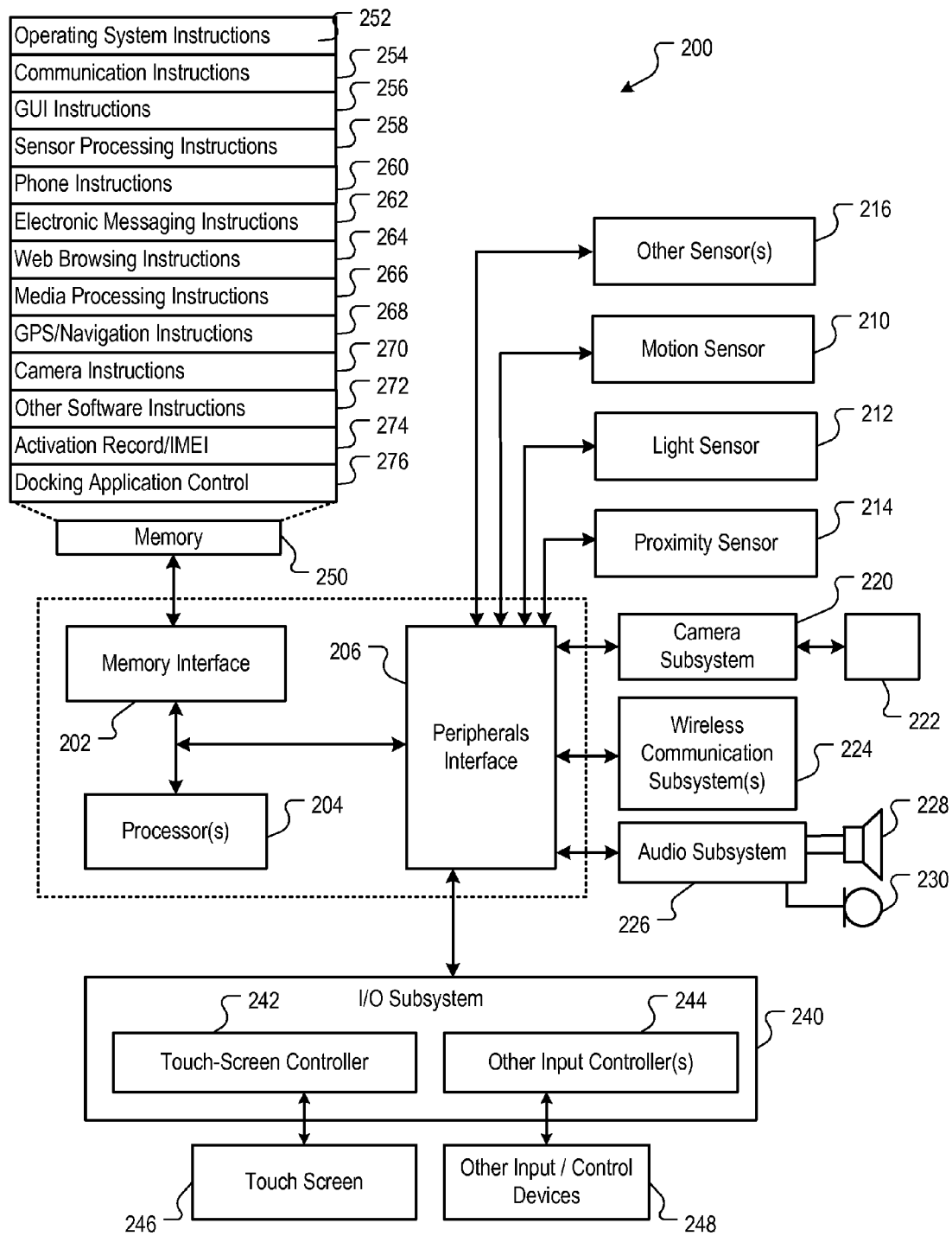
FIG. 2 shows an example system architecture of a mobile device.

FIG. 2 is a block diagram of an example architecture of a mobile device (e.g., mobile device 102). Mobile device 102 may include a memory interface 202, one or more data processors, image processors and/or central processing units 204, and a peripherals interface 206. Memory interface 202, the one or more processors 204 and/or the peripherals interface 206 may be separate components or may be integrated in one or more integrated circuits. The various components of mobile device 102 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a positioning system (e.g., GPS receiver), a temperature sensor, a biometric sensor, or other sensing device, to facilitate related functionalities.

A camera subsystem 220 and an optical sensor 222 (e.g., a charged coupled device ("CCD") or a complementary metal-oxide semiconductor ("CMOS") optical sensor) may be utilized to facilitate camera functions, such as recording photographs and video clips.

Communication functions may be facilitated through one or more wireless communication subsystems 224, which may include radio frequency receivers and transmitters and/or optical (e.g., infrared) receivers and transmitters. The specific design and implementation of the communication subsystem 224 may depend on the communication network(s) over which the mobile device is intended to operate. For example, a mobile device may include communication subsystems 224 designed to operate over a GSM network, a GPRS network, an EDGE network, a Wi-Fi or WiMax network, and a Bluetooth™ network. In particular, the wireless communication subsystem 224 may include hosting protocols such that the mobile device 102 may be configured as a base station for other wireless devices.

An audio subsystem 226 may be coupled to a speaker 228 and a microphone 230 to facilitate voice-enabled functions, such as voice recognition, voice replication, digital recording, and telephony functions.

The I/O subsystem 240 may include a touch screen controller 242 and/or other input controller(s) 244. The touch-screen controller 242 may be coupled to a touch screen 246. The touch screen 246 and touch screen controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246.

The other input controller(s) 244 may be coupled to other input/control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230.

In some implementations, the pressing of a button for a first duration may disengage a lock of the touch screen 246; and the pressing of the same or different button for a second duration that is longer than the first duration may turn power to the mobile device 102 on or off. The user may customize a functionality of one or more of the buttons. The touch screen 246 may, for example, also be used to implement virtual or soft buttons and/or a keyboard.

In some implementations, the mobile device 102 may present recorded audio and/or video files, such as MP3, AAC, and MPEG files. In some implementations, the mobile device 102 may include the functionality of an MP3 player.

The memory interface 202 may be coupled to the memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks. The operating system 252 may include instructions for handling basic system services and for performing hardware dependent tasks. In some implementations, the operating system 252 may be a kernel (e.g., UNIX kernel).

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/Navigation instructions 268 to facilitate GPS and navigation-related processes and instructions; camera instructions 270 to facilitate camera-related processes and functions; and/or other software instructions 272 to facilitate other processes and functions, e.g., access control management functions as described in reference to FIGS. 5 and 6. The memory 250 may also store other software instructions (not shown), such as instructions for processing calls in conjunction with the mobile device being linked with a base telephone system as will be described in greater detail below. In some implementations, the media processing instructions 266 are divided into audio processing instructions and video processing instructions to facilitate audio processing-related processes and functions and video processing-related processes and functions, respectively. An activation record and International Mobile Equipment Identity ("IMEI") 274 or similar hardware identifier may also be stored in memory 250.

The memory 250 further may store instructions associated with docking application control 276 to manage one or more functions of the mobile device 200 when the mobile device 200 is docked to a phone docking station (as will be discussed in greater detail with respect to FIGS. 3A and 3B). The docking application control instructions 276 may be initialized upon detecting that the mobile device 200 is docked to the phone docking station (e.g., either by using a physical connection or by engaging a port of the mobile device 200 to a port of the phone docking station).

The docking application control instructions 276, when executed, also may display a docking application control graphical user interface to allow a user of the mobile device 200 to program or configure functions of the base telephone system 302 and/or the mobile device 200 when docked. For example, through the docking application control graphical user interface, the mobile device 200 may be configured so that information presented on the interface (e.g., interface 101) of the mobile device 102 can be displayed on a display of the base telephone system. As another example, information associated with a call received on the base telephone system can be displayed on the docking application control graphical user interface associated with the mobile device 102. As another example, call and/or other functions available to the mobile device 102 may be transferred to the base telephone system for handling and execution on the base telephone system using the graphical interface associated with the mobile device 102.

The above identified instructions correspond to a set of instructions for performing one or more functions described above. These instructions need not be implemented as separate software programs, procedures, or modules. The memory 250 may include additional instructions or fewer instructions. Furthermore, various functions of the mobile device may be implemented in hardware and/or in software, including in one or more signal processing and/or application specific integrated circuits.

Phone Docking Station Overview

Figure 3A:
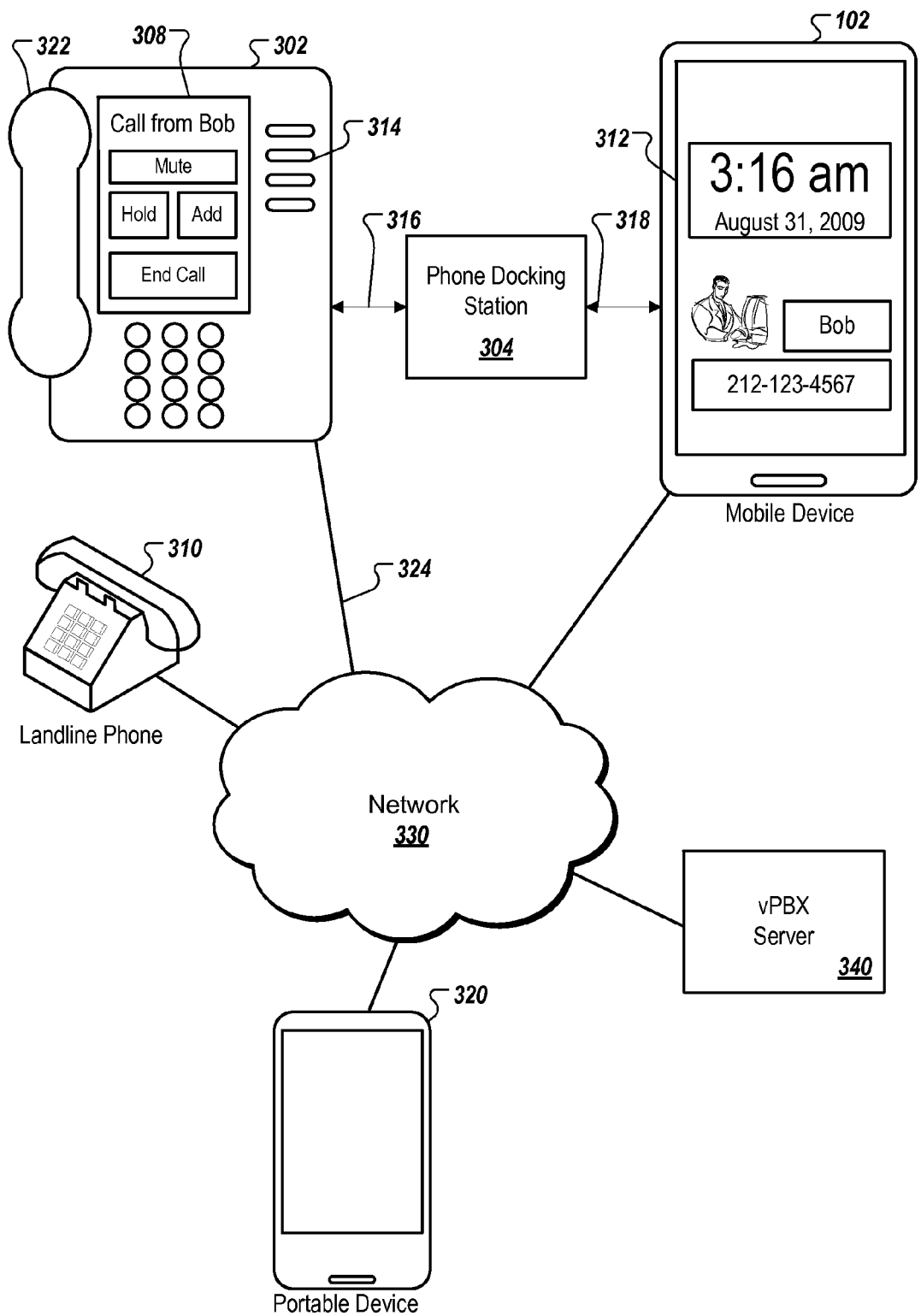
FIG. 3A shows a phone docking station that couples a mobile device to a base telephone system.

FIG. 3A shows a phone docking station that couples a mobile device to a base telephone system. Referring to FIG. 3A, a landline phone 310, a portable device 320, a vPBX server 340, a base telephone system 302 and a mobile device 102 may be connected to the network 330. As shown, the mobile device 102 may be connected to the base telephone system 302 through a phone docking station 304. In some implementations, the phone docking station 304 may be integrated directly with the base telephone system 302. Alternatively, the phone docking station 304 may be a stand alone unit that communicates with the base telephone system 302 and the mobile device 102 through wired (e.g., cables) or wireless (e.g., Bluetooth) connections. By way of example, the functions and features associated with the phone docking station 304 are described with reference to an integrated phone docking station and base telephone system. However, the phone docking station 304 is not limited to this arrangement.

In some implementations, the phone docking station 304 may allow an existing call received on an extension (e.g., telephone number) associated with the mobile device 102 to be transferred to the base telephone system 302 without the need to interrupt a call that is in session. In some implementations, PBX functionalities available on the mobile device 102 (e.g., call blocking, call forwarding, call screening, privacy director (PD), do not disturb (DND), call waiting, call conferencing, call holding, speed dialing, and the like) may be utilized on the base telephone system 302 when linked to the base telephone system 302. Information related to a call received on the mobile device 102 including, without limitation, caller name, caller phone number, caller address, date of call, time of call, city of origin at time of the call, ring tones, avatars for caller ID, other caller- and contact-related information, or any combination thereof may be presented on the display 308 of the base telephone system 302. Similarly, information associated with a call received on the base telephone system 302 may be presented on the display 312 associated with mobile device 102 when the base telephone system 302 and the mobile device 102 are linked. In some implementations, the user may continue to manage and view caller-related information on the mobile device 102 through the display 312 while using one or more control elements 314 (or other functionality) available on the base telephone system 302.

When the mobile device 102 is linked to the base telephone system 302, one or more functions of the mobile device 102 may be enabled on or for use with the base telephone system 302. Particularly, a user may utilize the base telephone system 302 as a "hub" to continue transmitting and receiving call signals until the call received on a number associated with the mobile device 102 is completed. For example, upon linking the mobile device 102 with the phone docking system 304 (e.g., by placing the mobile device 102, for example, in a cradle associated with the phone docking system 304), the user of the mobile device 102 can continue with an existing call by using the handset 322 of the base telephone system 302. Control elements 314 of the base telephone system 302 also may allow the user to manage one or more functionalities associated with mobile device 102 such as volume adjustment.

The phone docking station 304 may be adapted to assist communication between the mobile device 102 and the base telephone system 302. Communications between the phone docking station 304 and mobile device 102 may include transmissions of audio and video data and control signals from the mobile device 102 to the base telephone system 302. The phone docking station 304 also may function as a path through which the mobile device 102 may be supplied with power and/or charged.

The phone docking station 304 may be designed with one or more inputs and/or outputs corresponding to the input/output ports of the mobile device 102. The communication line 318 between the phone docking station 304 and the mobile device 102 and the communication line 316 between the phone docking station 304 and the base telephone system 302 may be implemented by means of electrical contacts or terminals, or in the form of wireless communication links such as infrared, Bluetooth, or other radio frequency communication links. In the case of wired communication, the phone docking station 304 may be connected to the mobile device 102 (and the base telephone system 302) using, for example, one or more cables. Alternatively, the phone docking station 304 may be integrated directly with the base telephone system 302 using one or more internal buses or terminals. In the case of wireless communication, the phone docking station 304 may include a wireless transceiver (not shown) for wirelessly communicating with the mobile device 102.

In some implementations, the phone docking station 304 may include a platform (not shown) to accommodate the mobile device 102. The platform may be configured to support the mobile device 102 in an upright (e.g., vertical) or laid down (e.g., horizontal) position while maintaining access to the user interface 312 of the mobile device 102. The platform may include removable inserts to accommodate various types of mobile devices with different sizes and shapes. The platform may include one single slot to accommodate one mobile device 102, or multiple slots to accommodate multiple devices. The platform may include a quick release latching mechanism that allows the mobile device 102 to be secured to the phone docking station 304 and released from the phone docking station 304 with simplicity, ease and minimal effort.

In some implementations, a link may be used in lieu of a platform. For example, a cable mechanically connecting the mobile device 102 to the base telephone system 302 may be used. The cable may provide electrical (e.g., data including audio and video signals) and other control signals between the mobile device 102 and the base telephone system 302.

The phone docking station 304 also may include one or more connectors for interfacing the mobile device 102 with the base telephone system 302. By way of example, the phone docking station 304 may include one or more connectors that engage one or more ports on the mobile device 102 when the mobile device 102 is placed in the platform. In the case of a stand alone unit, the phone docking station 304 may couple the mobile device 102 to a connector, port or transceiver that provides external connections to the base telephone system 302. In the case of an integrated phone docking station 304, the platform may be wired directly to the base telephone system 302.

In some implementations, the base telephone system 302 may assist in processing one or more events associated with the mobile device 102. Such events may include, but are not limited to, an incoming phone call, SMS, MMS, e-mail, address book lookup, and the like. Other events such as receiving an incoming phone call on a number associated with the mobile device 102, passing information associated with the incoming call from the mobile device 102 to the base telephone system 302 to allow a user to pickup the call and listen to the call through a speaker of the base telephone system 302, and terminating an existing call also are contemplated. Similarly, in some implementations, the mobile device 102 may assist in processing one or more events associated with the base telephone system 302. Such events may include, but are not limited to, an incoming phone call, SMS, MMS, e-mail, address book lookup, and the like. Other processing support is possible.

In some implementations, when the mobile device 102 is linked to the base telephone system 302 using the phone docking station 304, the base telephone system 302 may temporarily deactivate its telephone line 324 to the network 330 (e.g., a public switched telephone network (PSTN) so as to allow for support for calls received on the mobile device 102 using one or more features of the base telephone system (e.g., using the speaker of the base telephone system to support a call received on the mobile device 102). In some implementations, the mobile device 102 may use the base telephone system 302 as a "shell" to continue using existing channels of the base telephone system 302 to complete or otherwise support a call.

As an example, an office worker may have his own associated mobile device and a corresponding mobile telephone number. The office worker may receive a call on his mobile device at the mobile telephone number while away from his office. Upon arriving at the office, the office worker may dock his/her mobile device in the phone docking station 304 coupled to or integrated with his office phone connected to an office landline (e.g., base telephone system 302), and continue to carry out the call, including using one or more features associated with the base telephone system (e.g., using the speaker of the office phone) in support of the on-going call.

As another example, when the mobile device 102 is linked to the office phone (e.g., base telephone system 302) through the phone docking station 304, a telephone call that is made to a number associated with the mobile device 102 can be initially supported by the base telephone system 302 (e.g., broadcast through a speaker associated with the base telephone system 302). If the mobile device is de-linked (e.g., remove from the phone docking station 304), the call can be continued and supported without the further assistance of the base telephone system 302.

As another example, an office worker may have his own landline (e.g., base telephone system 302) in the office and a corresponding fixed telephone number. The office worker may receive a call on his land line (e.g., base telephone system 302) while in the office. If the mobile device 102 is linked to the base telephone system 302, features of the mobile device 102 can be accessed/used by the user during the call. For example, the display of the user interface 312 associated with the mobile device 102 may display call information associated with the call. As another example, other features associated with the mobile device 102 may be used to support the call (e.g., click to call).

In some implementations, the call can be handed off to the mobile device 102 for processing/supporting (e.g., if the mobile device 102 is de-linked, an existing call can be transferred to or otherwise supported by the mobile device 102 without further interaction with the base telephone system 302). In some implementation, this hand-off feature may be programmed in advance on the base telephone system 302. For example, a control button (or any interface element) may be configured on the base telephone system 302 (e.g., through a docking application control graphical user interface executed by the docking application control instructions 276) to effectuate the hand-off procedure. Once the control button is properly configured, the user of the mobile device 102 may dock the mobile device 102 on the phone docking station 304, receive a call on a number associated with the base telephone system 302, transfer the call to the mobile device 102, and de-dock the mobile device 102 from the phone docking station 304 while continuing the call on the mobile device 102 as the user walks away from the base telephone system 302. Note, where the call is initially placed to the number associated with the mobile device 102, this process is simple. Where the call is initially directed to a number associated with the base telephone system, more involved processing may be required. For example, an activation of the control button may initiate a three-way call to facilitate the mobile device being able to be removed from the phone docking station 304. A caller may dial a first number associated with the base telephony system 302. Once connected, the activation of the control may place the caller on hold, and initiate a call to a number associated with the mobile device 102. When the telephone rings on the mobile device, the mobile device can be removed from the phone docking station 304 and answered, resulting in the connection of the initial caller to the mobile device. This is but one method for allowing the mobile device to be connected to a call initially directed to the base telephone system. Other methods are possible, including the use of a call agent to bridge the two separate calls.

In some implementations, the mobile device 102 and the base telephone system 302 may be associated with the same phone number. In these implementations, a caller may dial a number associated with the mobile device 102, and the user of the mobile device 102 can answer the call using either the mobile device 102 or the base telephone system 302. Similarly, a caller may dial a number associated with the base telephone system 302, and the user can answer the call using either the mobile device 102 or the base telephone system 302.

The base telephone system 302 also may include a telephone line plug (e.g., an RJ-11 compatible plug) that may be coupled to a wall jack of a residential telephone system, an analog port of a PBX system for a business system, or logic that is coupled to the PBX system and used to execute one or more call processing rules. In some implementations, the phone docking station 304 (or processor 204) may control the power supply to the base telephone system 302 to regulate the on-hook and off-hook signaling that is associated with POTS protocols.

When the user no longer needs/desires to use features associated with the base telephone system 302, the mobile device 102 may be de-linked (e.g., removed or released) from the phone docking station 304. Releasing the mobile device 102 from the phone docking station 304 may release, reset or otherwise re-enable features of the base telephone system (e.g., cause the display 308 to revert back to an original state for displaying information associated with the base telephone system 302).

As discussed previously, the base telephone system 302 may be a simple landline (e.g., a wired home telephone, an office telephone, a voice-over-internet-protocol (VoIP) phone and the like), and may be connected to the network 330 to support one or more network tasks on behalf of the mobile device 102. Connection to a network allows the mobile device 102 to download/upload information (e.g., synchronize information in the mobile device with on-line available information).

In some implementations, the mobile device 102 also may be connected to a terminal rather than or in addition to base telephone system 302. FIG. 3B shows a phone docking station that couples a mobile device to a terminal. The terminal may provide one or more support features to the mobile device 102. For example, the terminal can be used to charge or power the mobile device, provide an external keyboard, speaker, microphone, or other functionality to either augment or support the mobile device when docked.

Figure 3B:
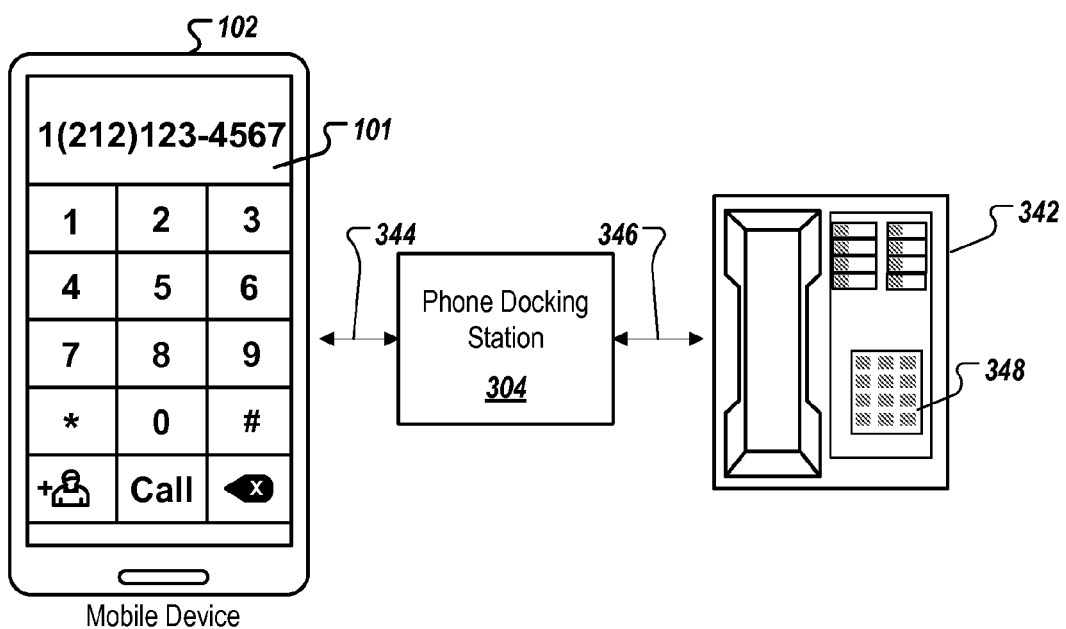
FIG. 3B shows a phone docking station that couples a mobile device to a terminal.

As shown in FIG. 3B, the mobile device 102 may be connected to a terminal 342 through the phone docking station 304. The communication line 344 between the phone docking station 304 and the mobile device 102 and the communication line 346 between the phone docking station 304 and the terminal 342 may be implemented by means of electrical contacts or terminals, or in the form of wireless communication links such as infrared, Bluetooth, or other radio frequency communication links. In the case of wired communication, the phone docking station 304 may be connected to the mobile device 102 and the terminal 346 using, for example, one or more internal buses or terminals cables. Alternatively, the phone docking station 304 may be integrated directly with the terminal 342 using one or more internal buses or terminals.

In some implementations, unlike the base telephone system 302, the terminal 342 need not be connected to any telecommunications network, or wired or wireless telephony communication link, and may be used to support one or more features and functions local to the mobile device 102. For example, a user may use the keypad 348 of the terminal 342 to dial a number of a contact. The number dialed may be presented on the interface 101 of the mobile device 102. The user also may use the keypad 348 to select a particular contact stored on the mobile device 102. In some implementations, the mobile device 102 may be used as a processor to control how the terminal 342 operates. For example, the mobile device 102 can configure or program the terminal 342 (e.g., through a docking application control graphical user interface executed by the docking application control instructions 276) to perform any general or specific processing or computing task on behalf of the mobile device 102. Alternatively, terminal 342 may just provide input/output support for signals processed by the mobile device 102.

Optionally, the terminal 342 also may include a display (not shown). Similar to the display 308 of the base telephone system 302 shown in FIG. 3A, the display of the terminal 342 also may be used to present information to the user, such as information that is included on the display of the mobile device 102.

In some implementations, the phone docking station 304 also may be linked to other devices such as, without limitation, personal computers including desktop or laptop computers, portable music players, storage devices and cameras. In some implementations, the phone docking station 304 may use the processor(s) of the mobile device 102 to perform general and specific computing tasks in conjunction with any electronic device that is coupled to the phone docking station 304. For example, if the mobile device 102 is coupled to a personal computer, the phone docking station 304 allows images stored on the mobile device 102 to be shown on the personal computer. As another example, if the mobile device 102 is coupled to a television, the phone docking station 304 allows the mobile device 102 to play audio files stored on the mobile device 102 through the speakers of the television.

Exemplary Processes

Figure 4:
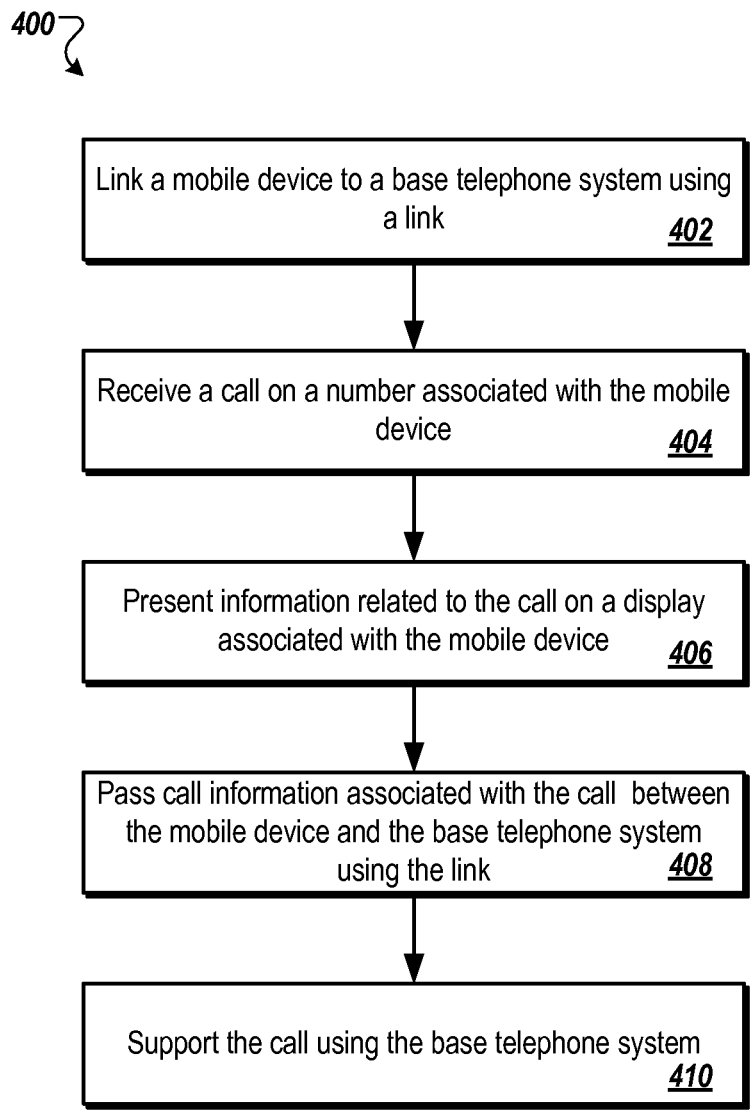
FIG. 4 shows an example process for processing a call received on a mobile device using a linked base telephone system.

FIG. 4 shows an example of a process 400 of processing a call received on a mobile device using a linked base telephone system. The process 400 can be performed, for example, by the mobile device 102, and for clarity of presentation, the description that follows uses the mobile device 102 as the basis of examples for describing the process 400. However, another system or combination of devices and systems also can be used to perform the process 400.

Process 400 begins with linking a mobile device to a base telephone system using a link (402). In some implementations, the mobile device is a cellular communication device. In some implementations, the mobile device includes a telephony communication link and the base telephone system includes a different, independent telephony communication line. For example, the mobile device may be linked to the base telephone system by connecting the mobile device to a phone docking station using a physical connection such as a serial cable to connect a serial port of the mobile device with a serial port of the phone docking station, and another physical connection such as a serial cable to connect a serial port of the phone docking station with a serial port of the base telephone system. In some implementations, the mobile device may be linked to the base telephone system by placing the mobile device on or into the phone docking station. Linking may include one or more initiation procedures, including enabling one or more features associated with either or both the mobile device and the base telephone system for use with the other.

In some implementations, upon detecting that the mobile device is linked, the mobile device can load/execute (e.g., using docking application control instructions 276) one or more routines associated with preferences pre-selected by a user of the mobile device. The preferences may include call settings previously set by the user, such as, for example, what call information and call functionalities are to be handled by which device (e.g., which functions are to be handled by the base telephone system or the cellular handset). In some implementations, the docking application control instructions, once executed by the mobile device when docked, may display a user interface through which the user may configure or reconfigure the mobile device and the base telephone system before one or more functions or features of the respective devices are enabled to support a call. Parameters configured by the user may be stored as user files in the memory of the mobile device.

In some implementations, linking the mobile device to the base telephone system may include merging one or more functions available on the mobile device with one or more functions available on the base telephone system. For example, the call termination function of the mobile device may be linked to the call termination function of the base telephone system to allow a user to terminate a call using the call termination button on the base telephone system. As another example, the numeric pads of the mobile device may be linked to the numeric pads of the base telephone system to allow the user to dial an outgoing call using the numeric pads of either the mobile device or base telephone system to support a call function. Linking the mobile device to the base telephone system also may include implementing one or more functions available on the mobile device in support of a call to the base telephone system. In some implementations, linking the mobile device to the base telephone system allows a feature or function installed on the mobile device to be supported on the base telephone system (e.g., where the base telephone system does not have the feature or function before linking). For example, linking the mobile device to the base telephone system allows the user of the mobile device to send text messages using the base telephone system (e.g., using the numeric pad of the base telephone system). As another example, linking the mobile device to the base telephone system allows the user to transfer music files to and play music files on the base telephone system. Similarly, linking the mobile device to the base telephone system allows for implementing one or more functions that are available on the base telephony system in support of a call to the mobile device. For example, a speaker phone associated with the base telephone system can be used to support a call received on the mobile phone when the mobile phone is so linked.

A call may be received on a number associated with the mobile device (404). For example, the mobile device may receive a call through the telecom network 104, the PSTN network 140, the IP network 160 or the cellular phone network 150 shown in FIG. 1. In some implementations, the call may be received prior to linking the mobile device to the base telephone system. In other implementations, the call may be received after linking the mobile device to the base telephone system.

Information related to the call may be presented on a display associated with the mobile device (406). In some implementations, information related to the call may include, without limitation, caller name, caller phone number, caller address, date of call, time of call, city of origin at time of the call, ring tones, avatars for caller ID, or any combination thereof.

Using the link, call information associated with the call may be passed between the mobile device and the base telephone system (408). In some implementations, the call information may be transferred to the base telephone system from the mobile device to the base telephone system through the phone docking system. In some implementations, call information to be transferred to the base telephone system may include audio and/or video information (e.g., to allow the call to be broadcast through a speaker associated with the base telephone system). Once linked, other features associated with the base telephone system may be utilized/accessed.

In some implementations, after the call information is passed to the base telephone system, a user of the mobile device may execute, program or reconfigure one or more call functions using one or more control elements (e.g., buttons, touch screens, etc.) of the base telephone system. As an example, a user of the mobile device may place the caller of an existing call on hold by pressing the "hold" button of the base telephone system. As another example, the user of the mobile device may place the caller of the existing call on hold, call a third party, and bridge the third party into the call with the caller of the existing call by pressing the "conference" button of the base telephone system (e.g., initiating a new call through either a telephony connection associated with either the base telephone system or the mobile device). In some implementations, any supported function associated with the base telephone system may be executed by selecting an appropriate user control associated with the base telephone system. In some implementations, the user of the mobile device may configure the specific function or utility of each user control element by invoking a docking application control graphical user interface. In some implementations, the docking application control graphical user interface may be invoked by the mobile device after the mobile device is linked to the phone docking system. In some implementations, the docking application control graphical user interface may be manually invoked by a user by executing a docking application program installed on the mobile device.

In some implementations, the call information may include one or more signals associated with a received call. For example, the one or more signals may include signals associated with call signaling of the received call.

The call may be supported using the base telephone system (410). In some implementations, supporting the call may include completing the call using a speaker, transmitter or receiver of the base telephone system to continually transmit or receive signals associated with the call. In some implementations, the user may complete the call without the need to drop the existing call on the mobile device and re-dial to the caller using the base telephone system.

In some implementations, after linking the mobile device to the base telephone system, one or more voicemails stored on the mobile device or on the mobile network connected to the mobile device may be synchronized with those stored on the base telephone system or on a server connected to the base telephone system. Synchronizing voicemails between the mobile device and the base telephone device allows the user of the mobile device to access the voicemails through the base telephone system (or through the mobile device or other voice mail retrieval means).

After linking the mobile device to the base telephone system, a call may be received on a number associated with the base telephone system. Because the base telephone system is linked to the mobile device, in some implementations, the call to the number associated with the base telephone system may be handled using the display of the mobile device. For example, the user of the mobile device may adjust the volume of the call using the volume buttons of the base telephone system or alternatively by way of a user interface presented on the mobile device.

In some implementations, operations 502-508 can be performed in the order listed or in parallel (e.g., by the same or a different process, substantially or otherwise non-serially) to achieve the same result. Operations 502-508 also can be performed by the same or different entities or systems.

Figure 5:
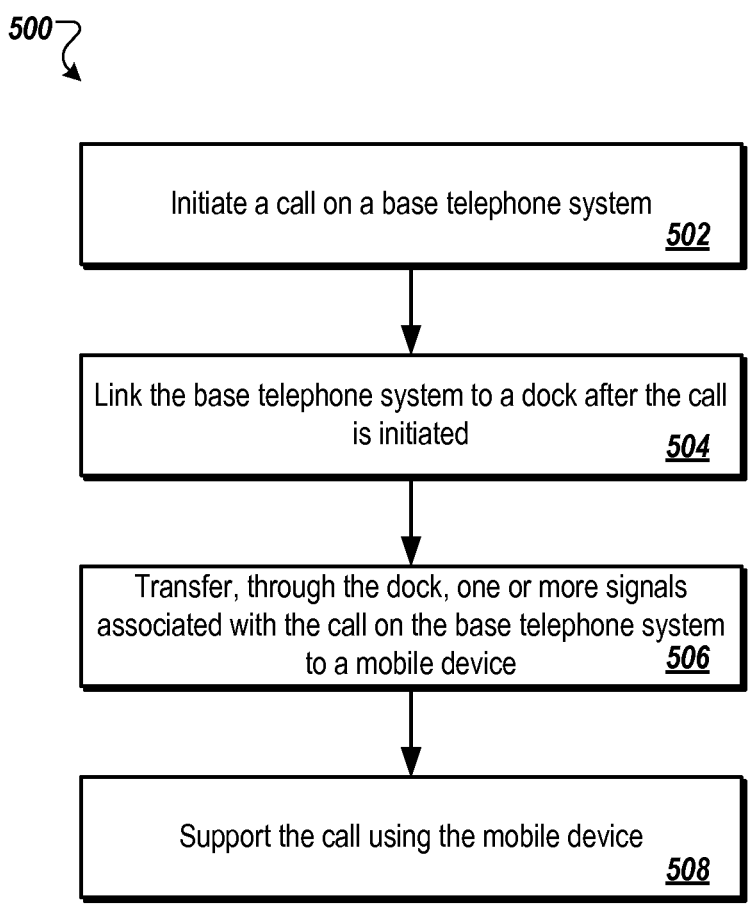
FIG. 5 shows another example process for processing a call received on a base telephone system using a linked mobile device.

FIG. 5 shows an example of a process 500 for processing a call received on a base telephone system by a linked mobile device. The process 500 can be performed, for example, by the base telephone system 302, and for clarity of presentation, the description that follows uses the base telephone system 302 as the basis of examples for describing the process 500. However, another system or combination of devices and systems also can be used to perform the process 500.

Process 500 begins with initiating a call on a base telephone system. In some implementations, the call may be initiated using a telephony communication link.

After the call is initiated, the base telephone system may be linked with a dock (502). In some implementations, the dock allows the base telephone system to communicate with a mobile device using the dock. The user may pre-configure which of the call functions and features of the base telephone system the user wishes to automatically support the mobile device when the base telephone system is linked to the dock. Similarly, the user may pre-configure which of the call functions and features of the mobile device the user wishes to automatically support the base telephone system when the mobile device is linked to the dock.

The link between the base telephone system and the mobile device may be implemented by means of a dock that includes electrical contacts or terminals, wireless communication means such as infrared, Bluetooth, or radio frequency communication means. In the case of wired communication, the base telephone system may be connected to the mobile device using, for example, a dock that includes one or more internal buses or terminals. In the case of wireless communication, the dock may include a wireless transceiver (not shown) for wirelessly communicating with the mobile device.

In some implementations, the base telephone system may be linked to the mobile device by connecting the base telephone system to a phone docking station using a physical connection such as a serial cable to connect a serial port of the base telephone system with a serial port of the phone docking station, and another physical connection such as a serial cable to connect a serial port of the phone docking station with a serial port of the mobile device. In some implementations, the base telephone system may be linked to the mobile device by placing the mobile device on the phone docking station.

Through the link, one or more signals associated with the call received on the base telephone system may be processed or transferred to a mobile device (506). In some implementations, the one or more signals may include call signaling associated with the call. The one or more signals also may include signals associated with executing PBX functionalities, or signals associated with call features including, for example, caller ID, date of call, time of call, ring tones, and the like. As an example, a user may dial, by name, on the mobile device using the contact directory stored on the base telephone system. As another example, the user may dial, by name, on the base telephone system using the contact directory stored on the mobile device. Upon selecting an individual contact, the base telephone system may call the selected contact, and generate a control signal containing the call information of the call to the mobile device.

The mobile device then may be used to support the call (508). In some implementations, the user of the mobile device may support the call by using a display associated with the mobile device to display information associated with the call received on the base telephone system or transmitter and receiver of the mobile device to continually transmit and receive signals associated with the call without needing to drop the call and re-dial to the caller separately using the mobile device.

In some implementations, where more than one call is received on the base telephone system, one of the calls may remain active while the remaining calls may be placed on hold. When the base telephone system is linked to the mobile device, either the active call may be transferred, or all of the calls including those currently on hold may be transferred to the mobile device. In some implementations, the user also may conference calls currently on hold into the active call. The joint conversation may continue to be carried out on the mobile device upon de-linking the base telephone system from the mobile device.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications may be made without departing from the spirit and scope of the invention. For example, while location determination has been described by way of GPS, other means for determining a location of a mobile device may be used including those that use active or passive sensors, or infer location from various information available. Accordingly, other implementations are within the scope of the following claims.

What is claimed is:

1. A method comprising:
receiving a call on a number associated with a mobile device including a telephony communication link;
linking the mobile device to a base telephone system using a link while the call is ongoing, the base telephone system including a different independent telephony communication link, wherein linking the mobile device to the base telephone system includes extending one or more call functions supported by the mobile device to the base telephone system, wherein the one or more call functions are not available on the base telephone system before the linking, and wherein extending the one or more call functions supported by the mobile device to the base telephone system comprises associating a respective control element of the base telephone system with each call function extended to the base telephone system; and
using the link,
supporting the ongoing call using the base telephone system, wherein supporting the call comprises:
displaying, on the base telephone system, information related to the call received on the number associated with the mobile device;
receiving, while the call is ongoing, a user input selecting a control element on the base telephone system; and
executing, while the call is ongoing, the call function supported by the mobile device and extended to the base telephone system that is associated with the selected control element.

2. The method of claim 1, where supporting the call includes using a speaker or receiver of the base telephone system to transmit and receive signals associated with the call.

3. The method of claim 1, further comprising:
receiving a call on a number associated with the base telephone system; and
using a display of the mobile device in support of the call received on the base telephone system, comprising displaying information related to the call received on the base telephone system on the display of the mobile device.

4. The method of claim 1, where linking the mobile device to the base telephone system includes extending one or more functions available on the base telephone system to the mobile device.

5. The method of claim 1, further comprising transferring the call to the base telephone system upon decoupling the mobile device from the link.

6. The method of claim 1, where the base telephone system is connected to an online network to allow the mobile device to access resources on the online network.

7. The method of claim 1, wherein extending one or more call functions supported by the mobile device to the base telephone system comprises extending to the base telephone system one or more functions provided by a virtual private branch exchange (vPBX) provider to a user of the mobile device.

8. A communication device comprising:
  a dock including a base telephone system having a first connection to a first telephony system; and
  a link coupling the dock to a mobile device, the mobile device including a separate independent link to a telephony system, the link communicating one or more signals between the mobile device and the base telephone system, the signals being associated with calls originating on either the mobile device or the base telephone system, wherein, when the mobile device is coupled to the dock during an ongoing call received on a number associated with a mobile device including a telephony communication link, the link extends one or more call functions supported by the mobile device to the base telephone system for supporting the call on the base telephone system, wherein the one or more call functions are not available on the base telephone system before being extended by the link, and wherein extending one or more call functions supported by the mobile device to the base telephone system comprises associating a respective control element of the base telephone system with each call function extended to the base telephone system.

9. The device of claim 8, where the first connection is a land line connection.

10. The device of claim 8, where the first connection is a Voice-over-IP connection.

11. The device of claim 8, further comprising the mobile device.

12. The device of claim 11, where the mobile device is a smart phone.

13. The device of claim 8, where the mobile device is associated with a telephone number and includes a display operable to display communication information related to inbound and outbound communication events.

14. The device of claim 13, where the display is configured such that when a call is received on the mobile device, call information associated with the call is passed through the link to enable one or more features of the base telephone system.

15. The device of claim 8, where, when the mobile device is linked while a call received on the mobile device is in progress, the mobile device transfers the call from the mobile device to the base telephony system to complete the call using the base telephone system.

16. The device of claim 8, where the dock includes a speaker and a display.

17. The device of claim 8, where the link is wireless link.

18. The device of claim 8, where the link is a physical link allowing docking of the mobile device to the dock.

19. The device of claim 8, where the link is configured to charge the mobile device.

20. The device of claim 8, where the link is configured to pass a telephony signal between the mobile device and the base telephone system.

21. The method of claim 1, wherein associating a respective control element of the base telephone system with each call function supported by the mobile device and extended to the base telephone system comprises associating a touch input submitted through a touchscreen of the base telephone system with one of the call functions supported by the mobile device and extended to the base telephone system.

* * * * *